United States Patent
Yoshino et al.

(10) Patent No.: US 12,549,341 B2
(45) Date of Patent: Feb. 10, 2026

(54) RECEPTION DEVICE, QUANTUM KEY DISTRIBUTION SYSTEM, AND METHOD FOR DETECTING QUANTUM SIGNAL

(71) Applicants: NEC Corporation, Tokyo (JP); National Institute of Information and Communications Technology, Tokyo (JP); NATIONAL UNIVERSITY CORPORATION HOKKAIDO UNIVERSITY, Sapporo (JP); The University of Tokyo, Tokyo (JP)

(72) Inventors: Ken-ichiro Yoshino, Tokyo (JP); Mikio Fujiwara, Tokyo (JP); Akihisa Tomita, Hokkaido (JP); Masato Koashi, Tokyo (JP); Masahiro Takeoka, Tokyo (JP); Masahide Sasaki, Tokyo (JP)

(73) Assignees: NEC CORPORATION, Tokyo (JP); NATIONAL INSTITUTE OF INFORMATION AND COMMUNICATIONS TECHNOLOGY, Koganei (JP); NATIONAL UNIVERSITY CORPORATION HOKKAIDO UNIVERSITY, Sapporo (JP); THE UNIVERSITY OF TOKYO, Bunkyo-ku (JP)

( * ) Notice: Subject to any disclaimer, the term of this patent is extended or adjusted under 35 U.S.C. 154(b) by 237 days.

(21) Appl. No.: 18/274,029

(22) PCT Filed: Jan. 24, 2022

(86) PCT No.: PCT/JP2022/002433
§ 371 (c)(1),
(2) Date: Jul. 25, 2023

(87) PCT Pub. No.: WO2022/163576
PCT Pub. Date: Aug. 4, 2022

(65) Prior Publication Data
US 2024/0405977 A1    Dec. 5, 2024

(30) Foreign Application Priority Data
Jan. 29, 2021    (JP) ................................. 2021-013985

(51) Int. Cl.
$H04L\ 9/08$         (2006.01)
$H04B\ 10/70$    (2013.01)
$H04L\ 9/12$         (2006.01)

(52) U.S. Cl.
CPC ........... *H04L 9/0852* (2013.01); *H04B 10/70* (2013.01); *H04L 9/12* (2013.01)

(58) Field of Classification Search
CPC ....... H04L 9/0852; H04L 9/12; H04L 9/0858; H04B 10/70
See application file for complete search history.

(56) References Cited

U.S. PATENT DOCUMENTS 11,387,992 B2 *   7/2022   Kikawada ............. H04L 9/0858
2011/0175866 A1 *  7/2011   Uehara ..................... H03L 7/18
                                                                 345/204
2019/0222415 A1 *  7/2019   Kikawada ............. H04L 9/0858

FOREIGN PATENT DOCUMENTS

CN      110784485 A    2/2020
JP       6-132725 A    5/1994
(Continued)

OTHER PUBLICATIONS

Communication dated Aug. 13, 2024, issued in Japanese Application No. 2022-578363.
(Continued)

*Primary Examiner* — Baotran N To
(74) *Attorney, Agent, or Firm* — Sughrue Mion, PLLC (57) ABSTRACT

An object is to prevent eavesdropping in quantum key distribution. A synchronization signal reception device
(Continued)

receives a synchronization signal that is an optical signal for defining a timing at which a quantum signal is detected, and outputs a reference signal corresponding to the synchronization signal. A clock signal generation unit generates a clock signal in response to the reference signal. A photon detection device detects a photon of the quantum signal in response to the clock signal. A timing of the clock signal randomly changes within a predetermined range.

3 Claims, 10 Drawing Sheets (56) References Cited

FOREIGN PATENT DOCUMENTS

| | | |
|---|---|---|
| JP | 2010-166285 A | 7/2010 |
| JP | 2010-206459 A | 9/2010 |
| JP | 2011-75577 A | 4/2011 |
| JP | 2019-125961 A | 7/2019 |
| WO | 2010/035876 A1 | 4/2010 |

OTHER PUBLICATIONS

Bing Qi, et al., "Time-Shift Attack in Practical Quantum Cryptosystems", Quantum Information and Computation, 2007, pp. 073-082, vol. 7, No. 1.
International Search Report for PCT/JP2022/002433 dated Apr. 12, 2022 (PCT/ISA/210).

* cited by examiner

RECEPTION DEVICE, QUANTUM KEY DISTRIBUTION SYSTEM, AND METHOD FOR DETECTING QUANTUM SIGNAL

CROSS REFERENCE TO RELATED APPLICATIONS

This application is a National Stage of International Application No. PCT/JP2022/002433 filed Jan. 24, 2022, claiming priority based on Japanese Patent Application No. 2021-013985 filed Jan. 29, 2021.

TECHNICAL FIELD

The present invention relates to a reception device, a quantum key distribution system, and a method for detecting a quantum signal.

BACKGROUND ART

With the spread of the Internet, there is an increasing social need for encryption technology such as secrecy and tamper prevention of communication and personal authentication. From such a background, in order to ensure communication security, the use of the quantum key distribution technology, which is a technology for sharing a secure secret key consisting of random numbers between remote locations, is in the spotlight because it makes eavesdropping difficult in principle (Patent Literatures 1 to 3).

In quantum key distribution, a quantum signal is generally transmitted from a transmission device to a reception device, and the quantum signal is detected using a plurality of photon detectors provided in the reception device.

In this case, if there is a variation (deviation) in detection efficiency between the photon detectors, the variation in detection efficiency may be used in eavesdropping. In the encryption technology, eavesdropping using such deviation in information is widely known. Therefore, it is known that it is preferable that the photon detectors have uniform detection efficiency to suitably prevent eavesdropping.

In quantum key distribution, various eavesdropping attempts such as side channel attacks have been made. Among them, there has been known an eavesdropping technique called a time shift attack (Non Patent Literature 1) with which an eavesdropper eavesdrops by manipulating a time at which a quantum signal reaches a photon detector without directly eavesdropping on the quantum signal by utilizing the vulnerability of the photon detector that detects the quantum signal.

CITATION LIST

Patent Literature

Patent Literature 1: Japanese Unexamined Patent Application Publication No. 2011-75577
Patent Literature 2: Japanese Unexamined Patent Application Publication No. 2019-125961
Patent Literature 3: Japanese Unexamined Patent Application Publication No. 2010-166285

Non Patent Literature

Non Patent Literature 1: Bing Qi, et. Al., "TIME-SHIFT ATTACK IN PRACTICAL QUANTUM CRYPTOSYSTEMS", 2007, Quantum Information and Computation, vol. 7, pp. 073-082

SUMMARY OF INVENTION

Technical Problem

In general, in quantum key distribution, a plurality of photon detectors are used to detect a quantum signal. Ideally, the quantum signal is carried by one photon, but actually, the quantum signal may be carried by two or more photons. However, since the intensity of the quantum signal is weak in any case, an avalanche photodiode (APD) capable of amplifying the received weak signal and outputting the amplified signal is used for a photon detector.

Figure 11:
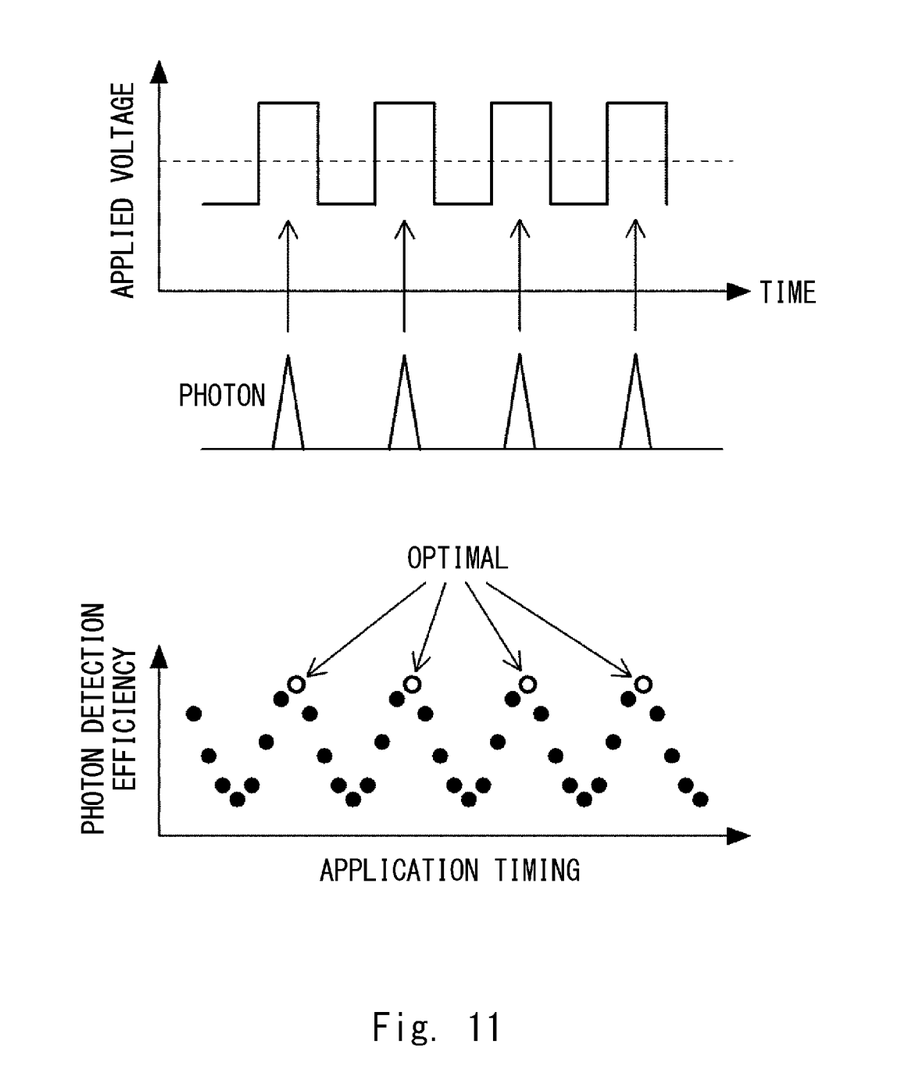
FIG. 11 is a diagram schematically illustrating a timing at which a voltage is applied to an APD and a degree of dependence of photon detection efficiency on time.

In the APD, an electron avalanche phenomenon results from electrons generated when a photon is incident in a state where a reverse bias exceeding a breakdown voltage is applied, which makes it possible to amplify a signal. Therefore, in quantum key distribution, a high reverse bias voltage is applied to the APD so that its application timing is synchronized with a timing at which a photon of the quantum signal is incident (e.g., Patent Literature 1). FIG. 11 schematically illustrates a timing at which a voltage is applied to the APD and a degree of dependence of photon detection efficiency on time. When the timing at which the reverse bias is applied to the APD coincides with the timing at which the photon is incident, the photon detection efficiency of the APD is maximized. However, it is known that, in a case where there is a time difference between the timing at which the reverse bias is applied to the APD and the timing at which the photon is incident, the detection efficiency of the APD decreases as the time difference increases. That is, the photon detection efficiency of the APD depends on the timing at which the photon is incident.

Figure 12:
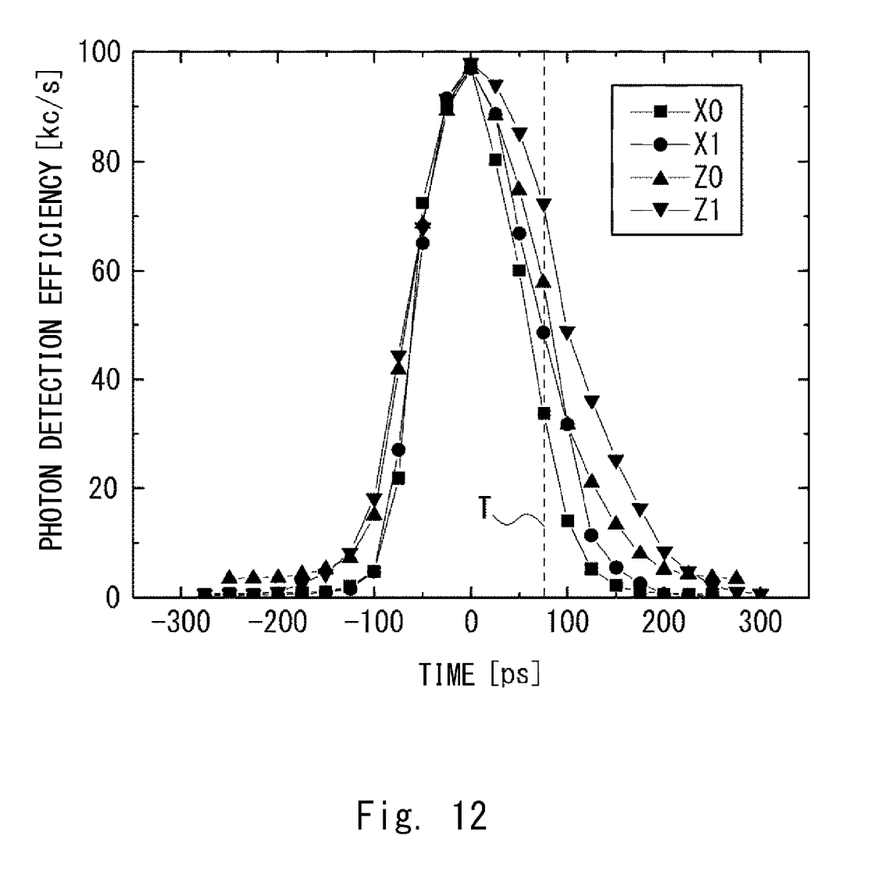
FIG. 12 is a diagram illustrating examples of degrees of dependence of photon detection efficiency on incident timing in a plurality of photon detectors.

In quantum key distribution, while a plurality of photon detectors (APD) are used, it is preferable that the photon detectors have the same photon detection efficiency to ensure high security. However, the photon detectors have individual differences in degree of dependence of photon detection efficiency on incident timing. FIG. 12 illustrates examples of degrees of dependence of photon detection efficiency on incident timing in the plurality of photon detectors. In the examples illustrated in FIG. 12, bits 0 and 1 of the X basis and bits 0 and 1 of the Z basis are detected by four photon detectors. As illustrated in FIG. 12, even though photons are incident at the same timing (e.g., timing T in FIG. 12), photon detection efficiency varies between the plurality of photon detectors.

Since each of the plurality of photon detectors is allocated to each bit of one of the bases of the quantum signal, if there is a variation in degree of dependence of photon detection efficiency on incident timing between the photon detectors, for example, the detection efficiency of each bit of each basis is analyzed, and as a result, a situation in which eavesdropping is permitted may occur. Therefore, it is required to prevent or suppress the influence of degree of dependence of photon detection efficiency on incident timing in the photon detector.

The present invention has been made in view of the above circumstances, and an object thereof is to prevent eavesdropping in quantum key distribution.

Solution to Problem

A reception device according to an aspect of the present invention includes: a synchronization signal reception device configured to receive a synchronization signal that is an optical signal for defining a timing at which a quantum signal is detected, and output a reference signal corresponding to the synchronization signal; a clock signal generation unit configured to generate a clock signal in response to the reference signal; a photon detection unit configured to detect a photon of the quantum signal in response to the clock signal; and a means for randomly changing a timing of the clock signal within a predetermined range.

A quantum key distribution system according to an aspect of the present invention includes: a transmission device configured to transmit a quantum signal; and a reception device including a photon detection device configured to detect the quantum signal, in which the reception device includes: a synchronization signal reception device configured to receive a synchronization signal that is an optical signal for defining a timing at which the quantum signal is detected, and output a reference signal corresponding to the synchronization signal; a clock signal generation unit configured to generate a clock signal in response to the reference signal; a photon detection unit configured to detect a photon of the quantum signal in response to the clock signal; and a means for randomly changing a timing of the clock signal within a predetermined range.

A method for detecting a quantum signal according to an aspect of the present invention includes: receiving a synchronization signal that is an optical signal for defining a timing at which a quantum signal is detected, and outputting a reference signal corresponding to the synchronization signal; generating a clock signal in response to the reference signal; detecting a photon of the quantum signal in response to the clock signal; and randomly changing a timing of the clock signal within a predetermined range.

Advantageous Effects of Invention

According to the present invention, it is possible to prevent eavesdropping in quantum key distribution.

EXAMPLE EMBODIMENT

Hereinafter, example embodiments of the present invention will be described with reference to the drawings. In the drawings, the same elements are denoted by the same reference signs, and redundant description will be omitted as necessary.

First Example Embodiment

A quantum key distribution system 1000 according to a first example embodiment will be described. For example, the quantum key distribution system 1000 is configured as one to which a BB84 protocol in a phase encoding type or in a polarization encoding type is applied.

Figure 1:
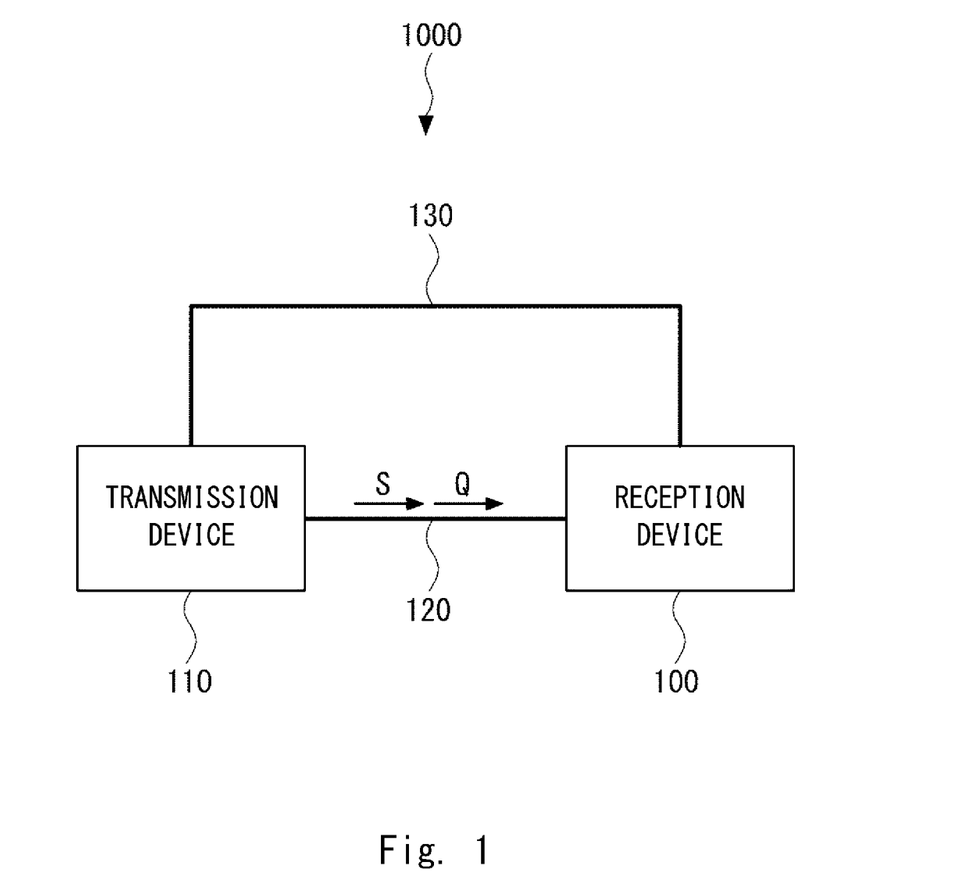
FIG. 1 is a diagram illustrating a schematic configuration of a quantum key distribution system.

FIG. 1 illustrates a schematic configuration of the quantum key distribution system 1000. The quantum key distribution system 1000 includes a transmission device 110, a reception device 100, and transmission paths 120 and 130. The transmission device 110 outputs a quantum signal Q used for giving an encryption key to the reception device 100 and a synchronization signal S used for controlling a timing at which the quantum signal Q is detected to the reception device 100 via the transmission path 120. Furthermore, the transmission device 110 and the reception device 100 can transmit and receive signals including, for example, basis information, test bits, error correction information, and the like via the transmission path 130 that is a public communication path.

The quantum signal Q is an optical signal transmitted as a light pulse consisting of a single photon or a number of photons sufficient to exhibit a quantum effect.

In the present example embodiment, the synchronization signal S is an optical signal transmitted through the transmission path 120 used for transmitting the quantum signal Q. The quantum signal Q and the synchronization signal S are, for example, optical signals having different wavelengths, and may be transmitted to the reception device 100 after being wavelength-multiplexed.

Figure 2:
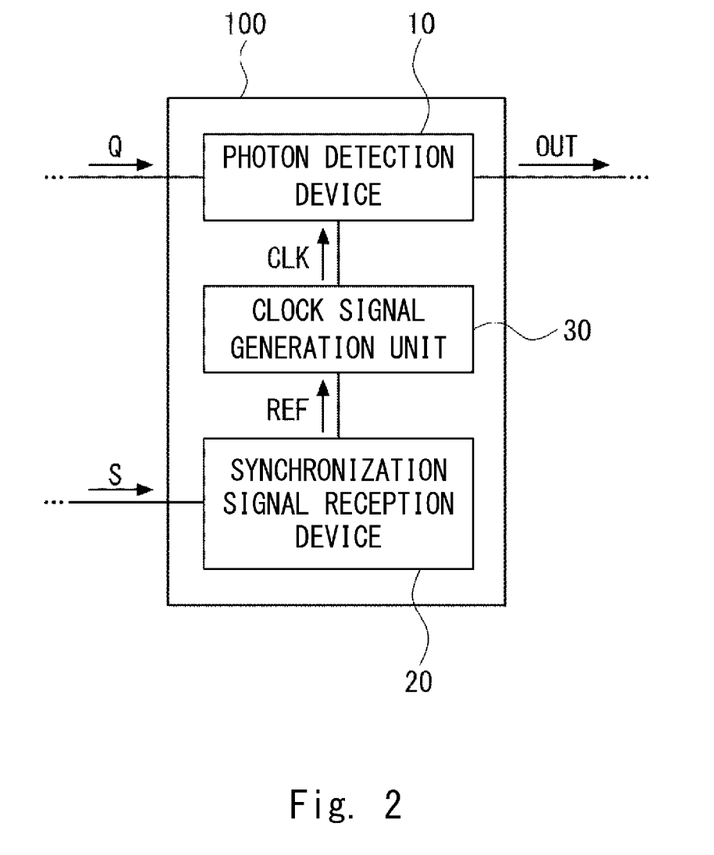
FIG. 2 is a diagram schematically illustrating a basic configuration of a reception device according to the first example embodiment.

FIG. 2 schematically illustrates a basic configuration of reception device 100 according to the first example embodiment. The reception device 100 includes a photon detection device 10, a synchronization signal reception device 20, and a clock signal generation unit 30. The quantum signal Q and the synchronization signal S are input to the reception device 100, the quantum signal Q is detected by the photon detection device 10, and the synchronization signal S is received by the synchronization signal reception device 20.

The clock signal generation unit 30 is configured by, for example, a phase locked loop (PLL), and generates a clock signal CLK and outputs the clock signal CLK to the photon detection device 10 and the synchronization signal reception device 20. In the present configuration, the clock signal generation unit 30 adjusts the timing of the clock signal CLK in response to a reference signal REF given from the synchronization signal reception device 20 to notify a timing at which the synchronization signal S is received. The clock signal CLK is generated as a high-speed clock signal having higher time accuracy than a reverse bias pulse timing signal and an output voltage signal, which will be described below.

Figure 3:
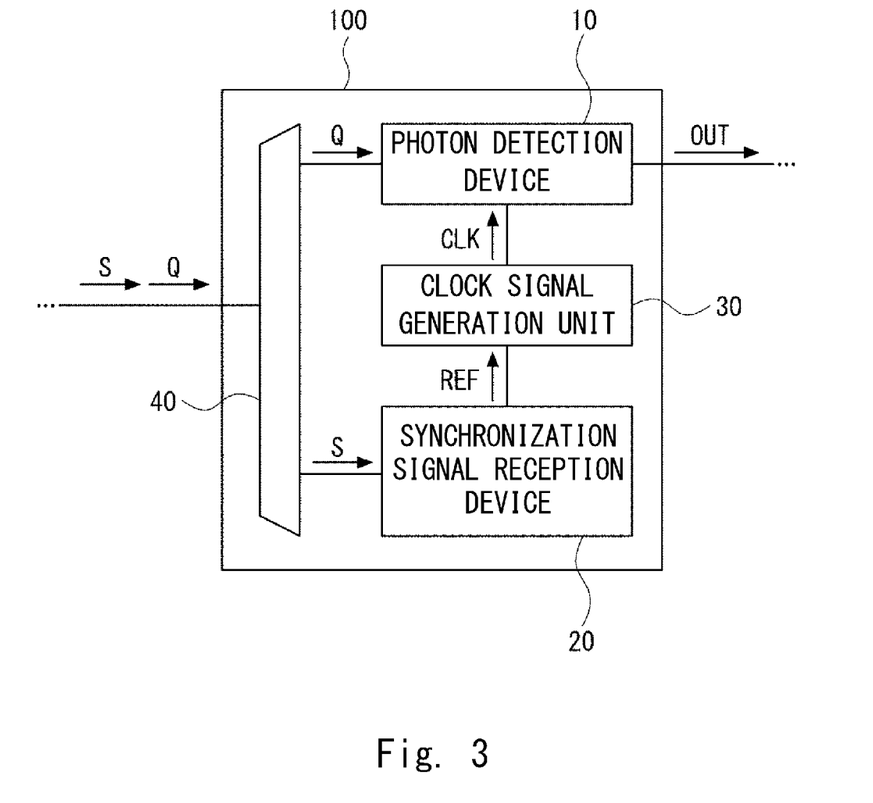
FIG. 3 is a diagram schematically illustrating an example of the configuration of the reception device according to the first example embodiment.

Next, the reception device 100 will be further described. FIG. 3 schematically illustrates an example of a configuration of the reception device 100 according to the first example embodiment. The reception device 100 includes, for example, a wavelength separation unit 40 that wavelength-separates the quantum signal Q and the synchronization signal S from each other. As a result, the quantum signal Q can be detected by the photon detection device 10, and the synchronization signal S can be received by the synchronization signal reception device 20. The wavelength separation unit 40 can be configured as any wavelength separation means such as a WDM coupler.

Next, the photon detection device 10 will be described. Here, in order to facilitate the understanding of the configuration of the photon detection device 10, a circuit configuration for detecting incident photons using one avalanche photodiode, which is a photon detector, and an output current of the one avalanche photodiode will be described. Note that, needless to say, the circuit configuration illustrated in FIG. 4, which will be described below, is multiply provided in the photon detection device according to a basis or the like used in quantum key distribution. Furthermore, it goes without saying that a configuration (not illustrated for simplification) for distributing photons to a plurality of photon detectors (avalanche photodiodes) is provided according to an encoding type (phase encoding, polarization encoding, or the like) applied to a quantum signal to be transmitted.

Figure 4:
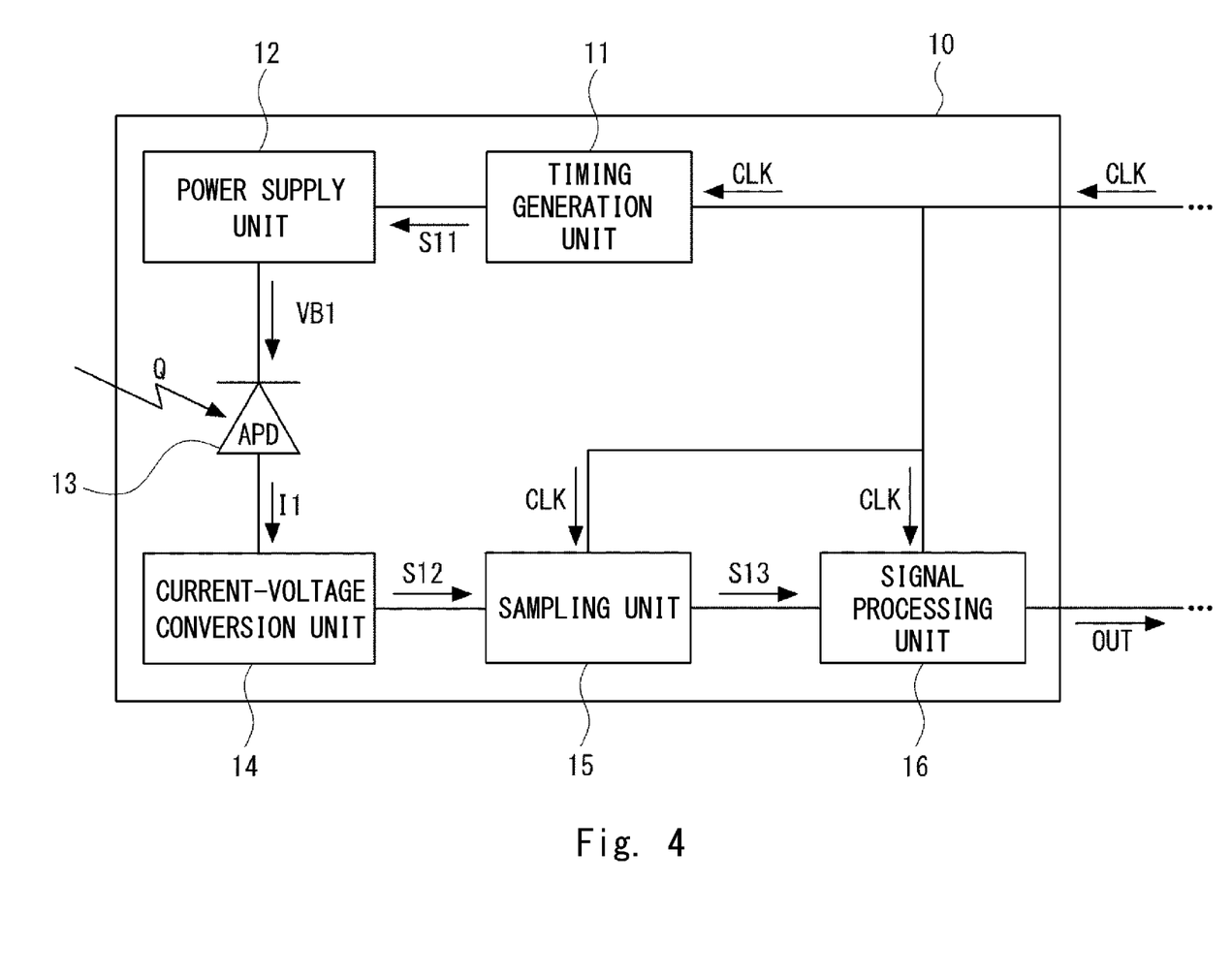
FIG. 4 is a diagram schematically illustrating a configuration of a photon detection device according to the first example embodiment.

FIG. 4 schematically illustrates a configuration of the photon detection device 10 according to the first example embodiment. The photon detection device 10 according to the first example embodiment includes a timing generation unit 11, a power supply unit 12, an avalanche photodiode (APD) 13, a current-voltage conversion unit 14, a sampling unit 15, and a signal processing unit 16.

The timing generation unit 11 generates a reverse bias pulse timing signal S11 in response to the clock signal CLK, and outputs the generated reverse bias pulse timing signal S11 to the power supply unit 12. The clock signal CLK is supplied from the clock signal generation unit 30 as will be described below.

The power supply unit 12 generates a reverse bias voltage VB1, and applies the generated reverse bias voltage VB1 to the APD 13 in response to the reverse bias pulse timing signal S11. The reverse bias voltage VB1 includes a DC component equal to or lower than the breakdown voltage of the APD 13 and a reverse bias pulse component equal to or higher than the breakdown voltage.

In the APD 13, when a photon, that is, the quantum signal Q, is incident into a light receiving surface at a timing when the reverse bias pulse component is applied to the APD 13, electrons are multiplied by an avalanche (electron avalanche) effect caused by generated photoelectrons. As a result, an output current I1 is output from the APD 13. Note that even in a case where no photon is incident, the output current I1 is detected as a current having a constant value because dark noise exists.

The current-voltage conversion unit 14 converts the output current I1 into an output voltage signal S12, which is a voltage signal, and outputs the generated output voltage signal S12 to the sampling unit 15. Here, a transimpedance amplifier (hereinafter referred to as TIA) or the like is used as the current-voltage conversion unit 14.

The sampling unit 15 samples the output voltage signal S12 in response to the clock signal CLK, and outputs an output voltage signal S13 having a discrete value, that is, a digital signal, to the signal processing unit 16. The sampling unit 15 may output a two-value digital signal, or may output a multi-value digital signal generated by analog-digital (AD) conversion. Here, an analog-digital converter (ADC) is used as the sampling unit 15.

In response to the clock signal CLK, the signal processing unit 16 performs predetermined signal processing on the output voltage signal S13, which is the digital signal, and outputs a photon detection signal OUT indicating a photon reception result.

Figure 5:
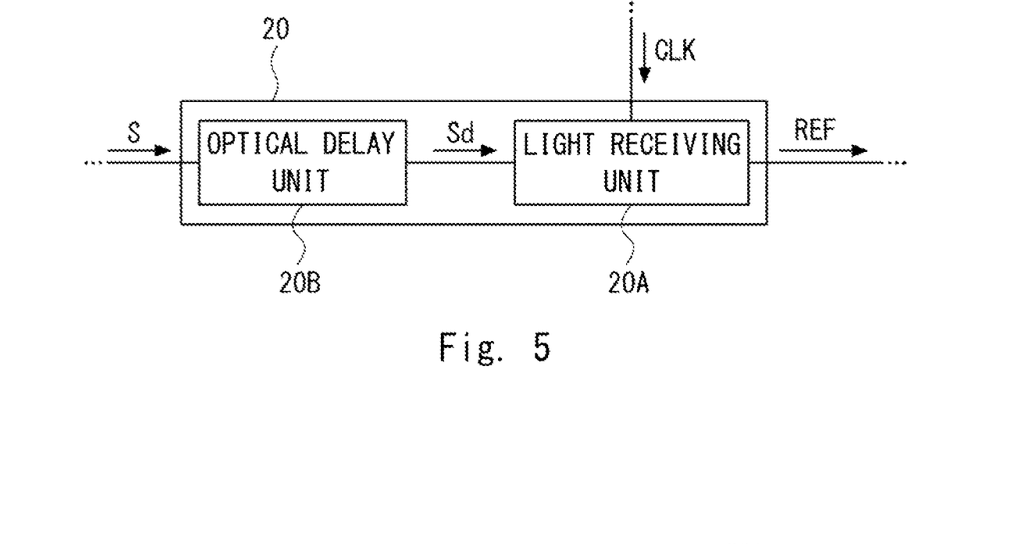
FIG. 5 is a diagram schematically illustrating a configuration of a synchronization signal reception device according to the first example embodiment.

Next, the synchronization signal reception device 20 will be described. FIG. 5 schematically illustrates a configuration of the synchronization signal reception device 20 according to the first example embodiment. The synchronization signal reception device 20 includes a light receiving unit 20A that receives a synchronization signal Sd and an optical delay unit 20B that controls a timing at which the synchronization signal S is input to the light receiving unit 20A.

Figure 6:
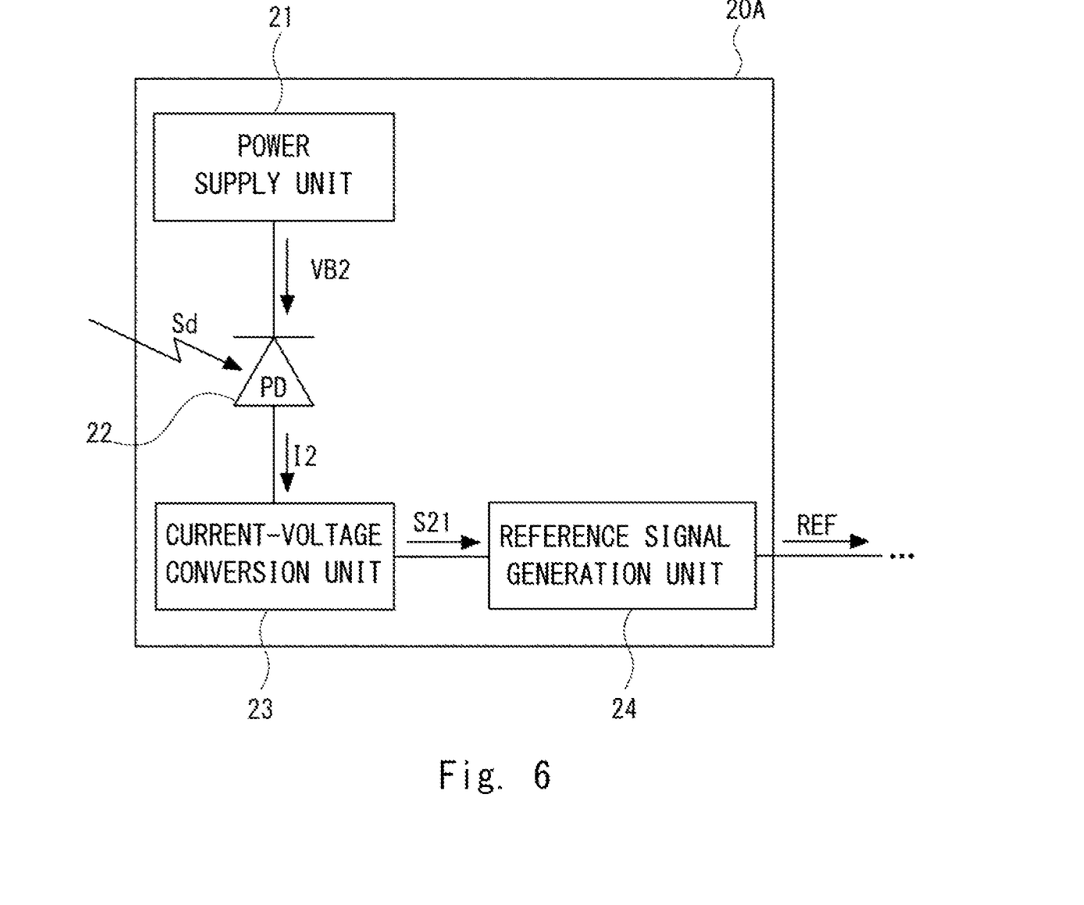
FIG. 6 is a diagram schematically illustrating a configuration of a light receiving unit according to the first example embodiment.

FIG. 6 schematically illustrates a configuration of the light receiving unit 20A according to the first example embodiment. The light receiving unit 20A includes a power supply unit 21, a photodiode 22, a current-voltage conversion unit 23, and a reference signal generation unit 24.

The power supply unit 21 generates a reverse bias voltage VB2, and applies the generated reverse bias voltage VB2 to the photodiode 22. The reverse bias voltage VB2 is output as, for example, a DC voltage of about several volts.

When a synchronization signal S (a synchronization signal Sd to be described below in this example) is incident into the light receiving surface in a state where the reverse bias voltage VB2 is applied, the photodiode 22 outputs an output current I2 corresponding to the intensity of the incident light. In general, the synchronization signal S has a higher light intensity than the quantum signal Q. Therefore, the type of the photodiode 22 that receives the synchronization signal S is not particularly limited, and various types of photodiodes including an APD can be used.

The current-voltage conversion unit 23 converts the output current I2 into an output voltage signal S21, which is a voltage signal, and outputs the output voltage signal S21 to the reference signal generation unit 24. Here, a transimpedance amplifier (hereinafter referred to as TIA) or the like is used as the current-voltage conversion unit 23.

The reference signal generation unit 24 outputs the reference signal REF, which is a digital signal, to the clock signal generation unit 30 in response to the output voltage signal S21. The reference signal generation unit 24 may output a two-value digital signal, or may output a multi-value digital signal generated by analog-digital (A/D) conversion. The reference signal generation unit 24 may be configured as, for example, a clock data recovery (CDR) circuit.

Figure 7:
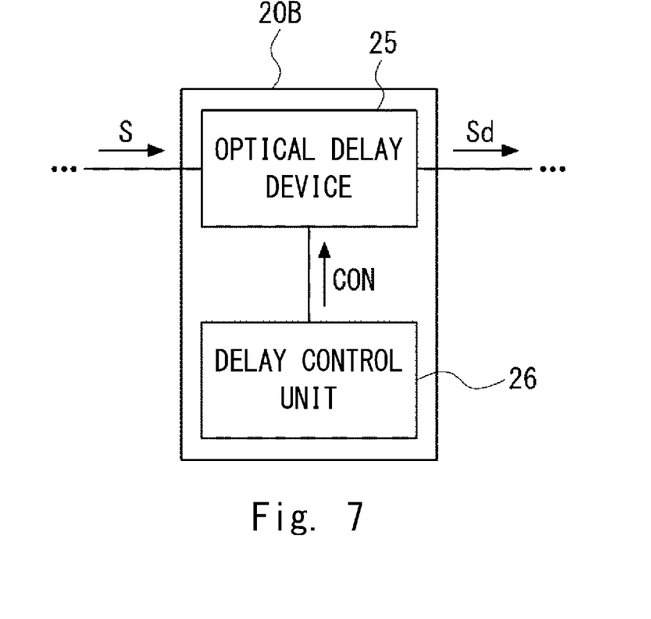
FIG. 7 is a diagram schematically illustrating a configuration of an optical delay unit according to the first example embodiment.

Next, the optical delay unit 20B will be described. FIG. 7 schematically illustrates a configuration of the optical delay unit 20B according to the first example embodiment. The optical delay unit 20B includes an optical delay device 25 and a delay control unit 26.

The synchronization signal S wavelength-separated by the wavelength separation unit 40 is incident into the optical delay device 25 of the synchronization signal reception device 20.

The optical delay device 25 is configured as an optical delay device capable of controlling a timing at which the synchronization signal S passing therethrough is output within a predetermined range. Here, for example, ±200 ps may be set as the predetermined range. The synchronization signal Sd delayed by the optical delay device 25 is output to the photodiode 22.

By outputting a delay control signal CON to the optical delay device 25, the delay control unit 26 controls the optical delay device 25 so that the delay in the optical delay device 25 randomly changes within the predetermined range.

Next, the influence of the delay of the synchronization signal S in the optical delay device 25 will be discussed. In the present configuration, as described above, the timing at which the synchronization signal Sd is output from the optical delay device 25 randomly varies in the predetermined range (e.g., ±200 ps). Accordingly, the timing at which the synchronization signal Sd is incident into the photodiode 22 randomly varies in the predetermined range (e.g., ±200 ps).

Therefore, when the photodiode 22 receives a synchronization signal Sd, the reference signal generation unit 24 outputs a reference signal REF corresponding to the timing at which the synchronization signal Sd is received to the clock signal generation unit 30. Based on the reference signal REF, the clock signal generation unit 30 adjusts the timing of the clock signal CLK. However, since the timing at which the synchronization signal Sd is incident into the photodiode 22 randomly varies as described above, the timing of the clock signal CLK also randomly varies.

Furthermore, in the photon detection device 10, the reverse bias pulse timing signal S11 is applied to the APD 13 that detects a photon of the quantum signal Q at a timing based on the clock signal CLK. Since the timing of the clock signal CLK varies randomly, the timing at which the reverse bias pulse timing signal S11 is applied to the APD 13 also varies randomly.

Note that it is natural that the quantum signal Q is originally received in synchronization with the timing indicated by the synchronization signal S that is not delayed. On the other hand, in the present example embodiment, by delaying the synchronization signal S, the timing of the clock signal CLK, which defines a timing at which the quantum signal Q is received, randomly varies. As a result, the timing at which the quantum signal Q is incident into the APD 13 is different from the timing at which the reverse bias voltage VB1 is applied to the APD 13. Further, whenever a synchronization signal S is received, the difference between those two timings also varies.

Therefore, the photon detection sensitivity of the APD 13 also varies, and the efficiency in detecting the quantum signal Q also randomly varies.

As described above, according to the present configuration, even if an eavesdropper knows dependence of photon detection sensitivity on incident timing in the APD 13, since the photon detection sensitivity of the APD 13 randomly varies, it is possible to suitably prevent eavesdropping.

In particular, according to the present configuration, since the photon detection timing in the photon detector is variable, it is possible to suitably prevent eavesdropping using a time shift attack on the photon detector utilizing dependence on photon incident timing.

Second Example Embodiment

A photon detection device according to a second example embodiment will be described. In the first example embodiment, the variation in the timing at which the quantum signal Q is received (that is, the timing of the clock signal CLK) is realized by delaying the synchronization signal S. However, in the present example embodiment, a configuration in which the variation in the timing at which the quantum signal Q is received is realized by clock generation processing will be described.

Figure 8:
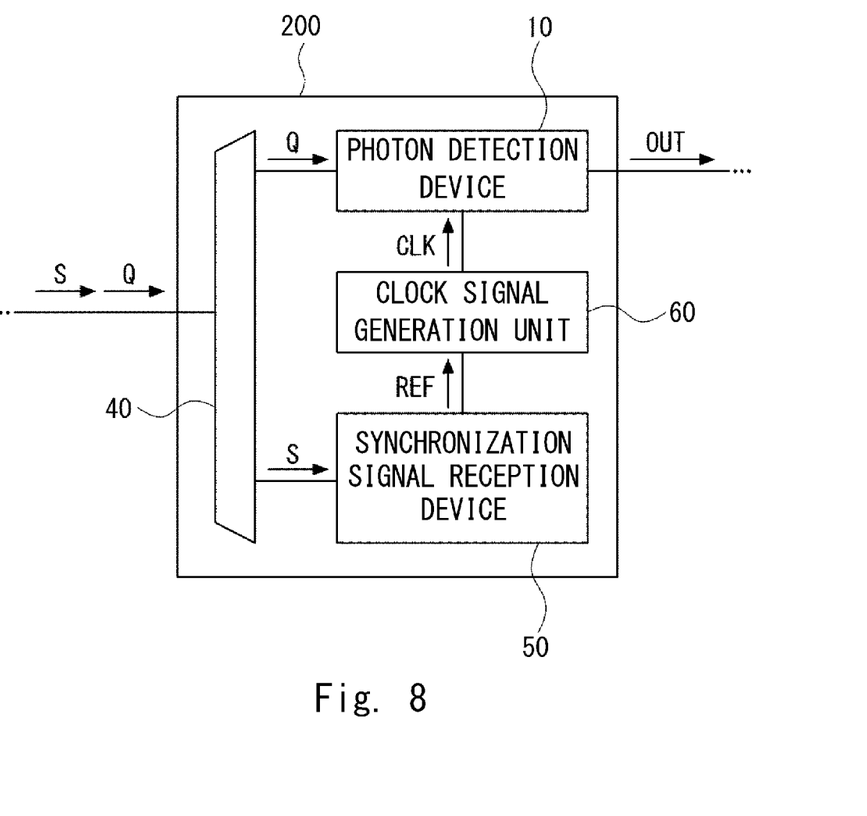
FIG. 8 is a diagram schematically illustrating a configuration of a reception device according to a second example embodiment.

FIG. 8 schematically illustrates a configuration of a reception device 200 according to the second example embodiment. The reception device has a configuration in which the synchronization signal reception device 20 and the clock signal generation unit 30 of the reception device 100 are replaced with a synchronization signal reception device 50 and a clock signal generation unit 60, respectively.

Figure 9:
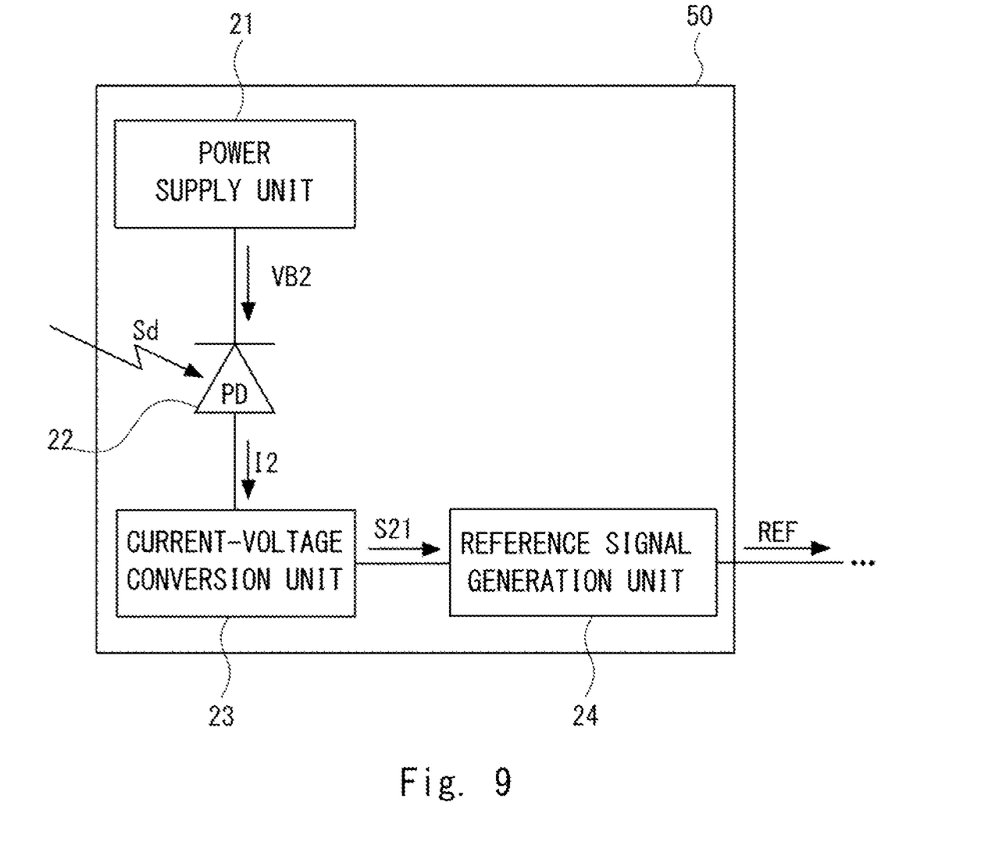
FIG. 9 is a diagram schematically illustrating a configuration of a synchronization signal reception device according to the second example embodiment.

The synchronization signal reception device 50 will be described. FIG. 9 schematically illustrates a configuration of synchronization signal reception device 50 according to the second example embodiment. The synchronization signal reception device 50 has a configuration in which the optical delay unit 20B of the synchronization signal reception device 20 is removed.

Figure 10:
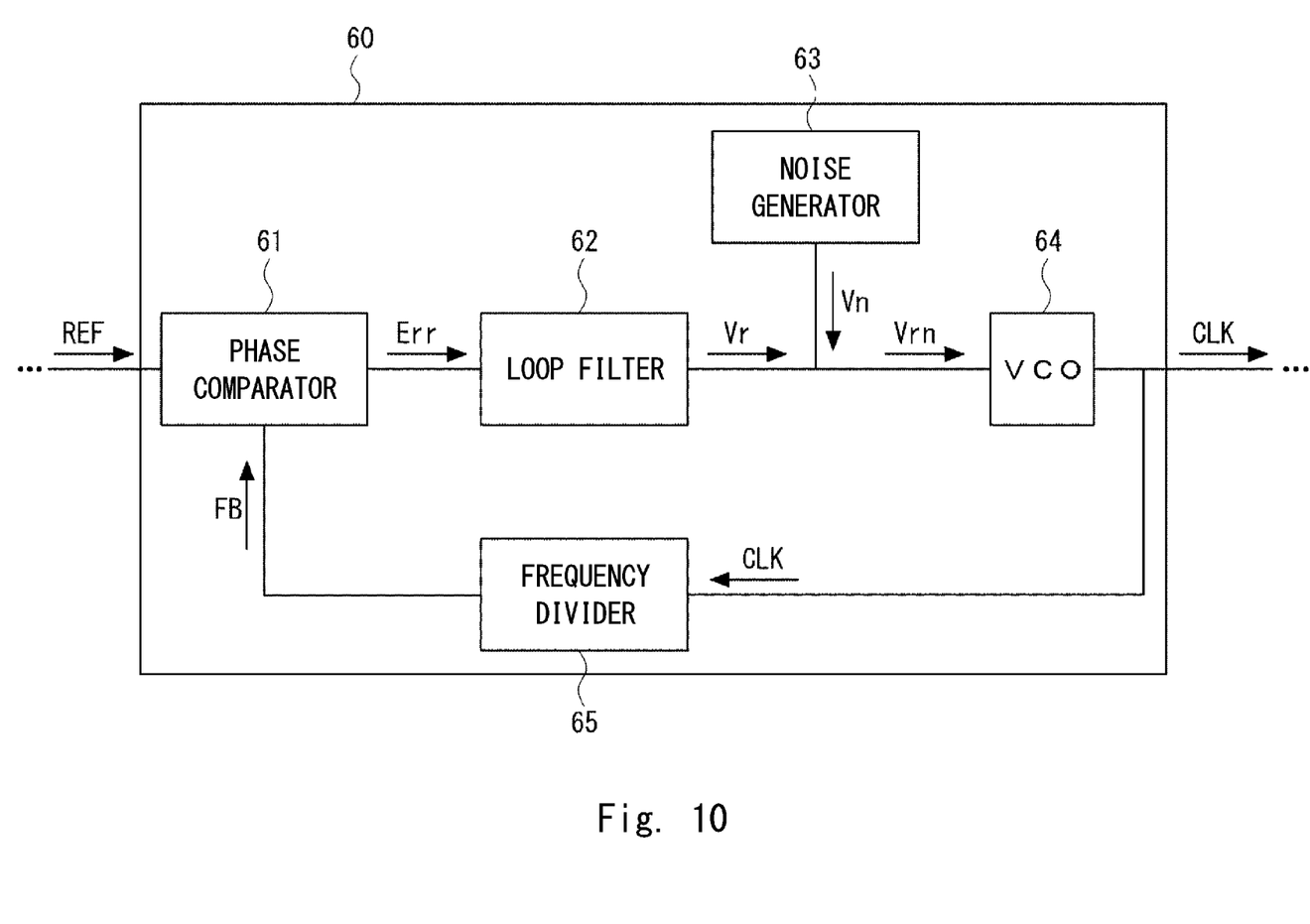
FIG. 10 is a diagram schematically illustrating a configuration of a clock signal generation unit.

Next, the clock signal generation unit 60 will be described. FIG. 10 schematically illustrates a configuration of the clock signal generation unit 60.

The clock signal generation unit 60 is configured by a phase locked loop, and includes a phase comparator 61, a loop filter 62, a noise generator 63, a voltage-controlled oscillator (VCO) 64, and a frequency divider 65.

The phase comparator 61 compares a frequency and a phase of a feedback signal FB from the frequency divider 65 with the frequency and the phase of the input reference signal REF, and outputs an error pulse signal Err indicating an error detected by the comparison to the loop filter 62.

The loop filter 62 removes a frequency ripple component of the error pulse signal Err for conversion into a DC voltage signal Vr.

The noise generator 63 generates and outputs a noise signal Vn, for example, a broadband white noise. The noise signal Vn is superimposed on the DC voltage signal Vr, and a DC voltage signal Vrn obtained as a result of the superimposition is input to the VCO 64.

The VCO 64 is configured as a circuit that outputs a clock signal CLK which is a pulse signal having a frequency corresponding to the DC voltage signal Vrn. Here, the clock signal CLK is a signal having a frequency that is N times (N is an integer of 2 or more) the frequency of the reference signal REF.

The DC voltage signal Vrn is a signal in which the noise signal Vn is superimposed on the DC voltage signal Vr. Therefore, the timings at which the clock signal CLK output from the VCO 64 rises and falls randomly vary due to the influence of the noise signal Vn.

The frequency divider 65 outputs the feedback signal FB obtained by dividing the clock signal CLK into 1/N to the phase comparator 61.

In the present configuration, the timing at which the quantum signal Q is incident into the APD 13 is different from the timing at which the reverse bias voltage VB1 generated in response to the clock signal CLK is applied to the APD 13. Therefore, the photon detection sensitivity of the APD 13 also varies, and the efficiency in detecting the quantum signal Q also randomly varies.

As described above, according to the present configuration, even if an eavesdropper knows dependence of photon detection sensitivity on incident timing in the APD 13, since the photon detection sensitivity of the APD 13 randomly varies, it is possible to suitably prevent eavesdropping, as in the first example embodiment.

In addition, according to the present configuration, since the photon detection timing in the photon detector is variable, it is possible to suitably prevent eavesdropping using a time shift attack on the photon detector utilizing dependence on photon incident timing, as in the first example embodiment.

OTHER EXAMPLE EMBODIMENTS

Note that the present invention is not limited to the above-described example embodiments, and can be appropriately changed without departing from the gist. For example, it has been described in each of the above-described example embodiments that an avalanche photodiode is used as a single-photon detector, but a single-photon detector having another configuration may be applied as long as the single-photon detector has photon detection efficiency depending on a timing at which a photon is incident.

Although the invention of the present application has been described above with reference to the example embodiments, the invention of the present application is not limited to the above. Various modifications that can be understood by those skilled in the art can be made to the configuration and details of the invention of the present application within the scope of the invention.

10 PHOTON DETECTION DEVICE
11, 21 TIMING GENERATION UNIT
12, 21 POWER SUPPLY UNIT
13 APD
14, 23 CURRENT-VOLTAGE CONVERSION UNIT
15 SAMPLING UNIT
16 SIGNAL PROCESSING UNIT
20, 50 SYNCHRONIZATION SIGNAL RECEPTION DEVICE
20A LIGHT RECEIVING UNIT
20B OPTICAL DELAY UNIT
22 PHOTODIODE
24 REFERENCE SIGNAL GENERATION UNIT
25 OPTICAL DELAY DEVICE
26 DELAY CONTROL UNIT
30, 60 CLOCK SIGNAL GENERATION UNIT
40 WAVELENGTH SEPARATION UNIT
61 PHASE COMPARATOR
62 LOOP FILTER
63 NOISE GENERATOR
64 VCO
65 FREQUENCY DIVIDER
100, 200 RECEPTION DEVICE
110 TRANSMISSION DEVICE
120, 130 TRANSMISSION PATH
1000 QUANTUM KEY DISTRIBUTION SYSTEM
CLK CLOCK SIGNAL
CON DELAY CONTROL SIGNAL
Err ERROR PULSE SIGNAL
FB FEEDBACK SIGNAL
I1, I2 OUTPUT CURRENT
OUT PHOTON DETECTION SIGNAL
Q QUANTUM SIGNAL
REF REFERENCE SIGNAL REF
S, Sd SYNCHRONIZATION SIGNAL
S11 REVERSE BIAS PULSE TIMING SIGNAL
S12, S13, S21 OUTPUT VOLTAGE SIGNAL
VB1, VB2 REVERSE BIAS VOLTAGE
Vn NOISE SIGNAL
Vr, Vrn DC VOLTAGE SIGNAL

The invention claimed is:

1. A reception device comprising:
a synchronization signal reception device configured to receive a synchronization signal that is an optical signal for defining a timing at which a quantum signal is detected, and output a reference signal corresponding to the synchronization signal;
a clock signal generation unit configured to generate a clock signal in response to the reference signal;
a photon detection unit configured to detect a photon of the quantum signal in response to the clock signal; and
a timing changing unit configured to randomly change a timing of the clock signal within a predetermined range, wherein
the timing changing unit is the clock signal generation unit,
the clock signal generation unit generates the clock signal so that a timing of the clock signal randomly varies, and
the clock signal generation unit includes:
a noise generation unit configured to superimpose a noise signal on a Direct Current voltage signal corresponding to the reference signal; and
a voltage-controlled oscillator configured to output the clock signal in response to the Direct Current voltage signal on which the noise signal is superimposed.

2. A quantum key distribution system comprising:
a transmission device configured to transmit a quantum signal; and
a reception device including a photon detection device configured to detect the quantum signal,
wherein the reception device includes:
a synchronization signal reception device configured to receive a synchronization signal that is an optical signal for defining a timing at which the quantum signal is detected, and output a reference signal corresponding to the synchronization signal;
a clock signal generation unit configured to generate a clock signal in response to the reference signal;
a photon detection unit configured to detect a photon of the quantum signal in response to the clock signal; and
a timing changing unit configured to randomly change a timing of the clock signal within a predetermined range, wherein
the timing changing unit is the clock signal generation unit,
the clock signal generation unit generates the clock signal so that a timing of the clock signal randomly varies, and
the clock signal generation unit includes:
a noise generation unit configured to superimpose a noise signal on a Direct Current voltage signal corresponding to the reference signal; and
a voltage-controlled oscillator configured to output the clock signal in response to the Direct Current voltage signal on which the noise signal is superimposed.

3. A method for detecting a quantum signal, the method comprising:
receiving a synchronization signal that is an optical signal for defining a timing at which a quantum signal is detected, and outputting a reference signal corresponding to the synchronization signal;
generating a clock signal in response to the reference signal so that a timing of the clock signal randomly varies within the predetermined range;
detecting a photon of the quantum signal in response to the clock signal;
wherein
a noise signal is superimposed on a Direct Current voltage signal corresponding to the reference signal, and
the clock signal is output from a voltage controlled oscillator in response to the Direct Current voltage signal on which the noise signal is superimposed.

* * * * *